United States Patent [19]
Olivieri

[11] Patent Number: 5,590,932
[45] Date of Patent: Jan. 7, 1997

[54] ANTI-CHUCK SEAT RECLINER

[75] Inventor: Lawrence J. Olivieri, Lake Orion, Mich.

[73] Assignee: Fisher Dynamics Corporation, St. Clair Shores, Mich.

[21] Appl. No.: 335,312

[22] Filed: Nov. 7, 1994

[51] Int. Cl.$^6$ .................................................. B60N 2/02
[52] U.S. Cl. .................................... 297/367; 297/354.12
[58] Field of Search .................................. 297/366, 367, 297/368, 369, 354.12; 475/346; 74/409, 440

[56] References Cited

U.S. PATENT DOCUMENTS

| | | |
|---|---|---|
| Re. 32,884 | 3/1989 | Kluting et al. . |
| 4,223,947 | 9/1980 | Cremer . |
| 4,227,741 | 10/1980 | Gross et al. .............................. 297/362 |
| 4,295,682 | 10/1981 | Kluting et al. . |
| 4,314,729 | 2/1982 | Klueting . |
| 4,357,050 | 11/1982 | Fisher, III . |
| 4,406,497 | 9/1983 | Kluting . |
| 4,591,207 | 5/1986 | Nithammer et al. . |
| 4,615,551 | 10/1986 | Kinaga et al. . |
| 4,659,146 | 4/1987 | Janiaud ..................................... 297/367 |
| 4,687,252 | 8/1987 | Bell et al. . |
| 4,705,319 | 11/1987 | Bell . |
| 4,709,965 | 12/1987 | Kazaoka et al. . |
| 4,765,681 | 8/1988 | Houghtaling et al. . |
| 4,770,463 | 9/1988 | Nishino . |
| 4,781,415 | 11/1988 | Heesch et al. .................. 297/354.12 X |
| 4,795,213 | 1/1989 | Bell . |
| 4,801,177 | 1/1989 | Kanazawa . |
| 4,913,494 | 4/1990 | Ikegaya . |
| 4,946,223 | 8/1990 | Croft et al. ............................. 297/367 |
| 5,150,632 | 9/1992 | Hein . |
| 5,156,439 | 10/1992 | Idlani et al. . |
| 5,205,609 | 4/1993 | Notta et al. . |

*Primary Examiner*—Milton Nelson, Jr.
*Attorney, Agent, or Firm*—Harness, Dickey & Pierce, P.L.C.

[57] ABSTRACT

A locking pivot mechanism which may be used as a seat recliner to reduce chucking of a seat back has a toothed quadrant, a gear with two sets of teeth, a toothed pawl, and an engagement member. The engagement member is biased against the pawl which, in turn, is forced into engagement with one set of the gear teeth and the other set of teeth engage with the quadrant to lock the quadrant against rotation, thus reducing chucking.

9 Claims, 2 Drawing Sheets

5,590,932

ANTI-CHUCK SEAT RECLINER

BACKGROUND AND SUMMARY OF THE INVENTION

This invention relates generally to a locking pivot mechanism, and more particularly to an adjustable seat recliner mechanism for reducing undesirable movement when the mechanism is locked.

Locking pivot mechanisms generally consist of a first pivoting member having a plurality of teeth which is called a quadrant, and a second toothed member, called a pawl, adapted to lockingly engage the quadrant. The mechanisms are operable to lock the quadrant and restrict its rotation, or to release the quadrant to allow it to rotate and to enable a seat back affixed to the quadrant to recline. The mechanism is selectively locked or released by manipulating the pawl, which is mounted for rotation between an engaged position where the teeth of the pawl and the quadrant mesh, and a disengaged position where the pawl retracts from and no longer meshes with the quadrant. When the quadrant and the pawl rotate, they define a first and a second center of rotation, respectively. The quadrant and pawl generally mesh at a pitch point which is not on a line between the first and second centers of rotation, so that when they are meshed, the quadrant is effectively prevented from rotating. Locking pivot mechanisms also may include a device, such as a spring, for releasably urging the pawl to rotate from the disengaged to the engaged position, so that the default position for the mechanism is a locked condition. U.S. Pat. Nos. 4,223,947; 4,314,729; 4,406,497; 4,615,551; 4,765, 681; 4,770,463; 4,709,965; 4,801,177; 4,913,494; 4,591, 207; 4,295,682; and RE 32,884 illustrate systems which utilize various pawl and quadrant engagement assemblies.

Another type of locking pivot mechanism includes a quadrant, a gear with two sets of teeth, a pawl, and an activating mechanism. Here, the quadrant engages one set of gear teeth and the pawl engages the other set of gear teeth. The activating mechanism is activated which, in turn, moves the pawl from an engaged position, where the pivot mechanism is locked in place, to a disengagement position, where the quadrant is free to rotate on the gear. Examples of such types of pivot mechanism are illustrated in U.S. Pat. Nos. 5,156,439; 5,150,632; and 5,205,609.

In reclining seats, the quadrant is mounted to an extremely long lever arm, namely the seat back, against which various forces are applied. For example, the locking recliner mechanism in a vehicle seat is quite small when compared to the length of the reclining seat back, and vehicle vibration or movement of an occupant may impose various forces upon that lever arm during use. These forces can impose a large moment about the quadrant when applied along such a lengthy lever arm, which can overcome the capability of the mechanism to anchor the quadrant and seat back. In addition, any imperfections in the components of the pivot mechanism, such as play or backlash between the engaging teeth or tolerances between the mechanism components, may allow the quadrant to move a minuscule amount even when the mechanism is locked. These small excursions are magnified by the length of the lever arm and become noticeable at the upper end of the seat. For example, the seat back of an unoccupied seat may tend to oscillate when the vehicle encounters rough road conditions. Because the motion of the seat back is amplified by the length of the seat back frame, the vibration of the seat back can be relatively large. This magnified play in a locking pivot mechanism has been termed "chucking", and refers to any imperfection or play in the mechanism components which allows movement of the quadrant and the attached seat back while the mechanism is in a locked condition.

One technique which has been employed to reduce chucking is to form the components of the pivot mechanism with exceedingly close tolerances. In other words, the corresponding teeth as well as the pivot bearings for the rotating components may be manufactured with very high precision. This technique reduces play in the mechanism, and thus reduces chucking. However, manufacturing to such close tolerances is expensive, and close tolerances may bind the components of the system and prevent smooth operation. The above disclosed patents illustrate ways to eliminate this problem. However, designers continue to strive to improve the art.

It is therefore desirable to construct a locking pivot mechanism which is relatively small and simple, which operates smoothly without binding, and does not require excessively close tolerances, yet is capable of locking the quadrant in a fixed position to inhibit play or excursions.

Accordingly, the locking pivot mechanism of the present invention provides a novel configuration to reduce chucking. The present invention provides for pawl and gear teeth engagement on the lower half of the gear. Also, the gear center, gear and pawl pitch point, and pawl and engagement member contact point are substantially collinear. Further, the pawl center of rotation is on a tangent through the pitch point of the pitch arch. These features enable firm engagement of the pivot mechanism and reduce chucking.

These and other advantages and features will become apparent from the following description and claims in conjunction with the accompanying drawings.

DETAILED DESCRIPTION OF THE PREFERRED EMBODIMENTS

Figure 1:
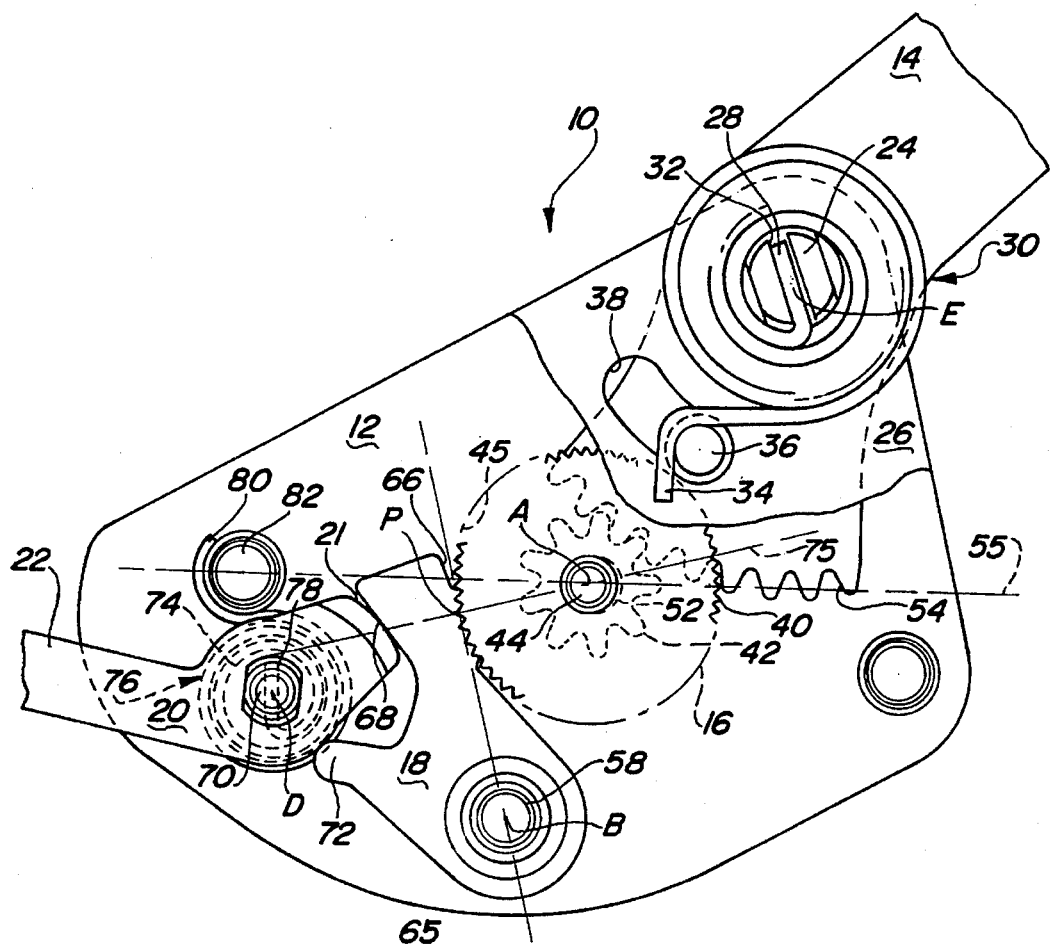
FIG. 1 is a side elevational view of a pivot mechanism arranged according to the principles of the present invention, shown in a locked configuration.
Figure 2:
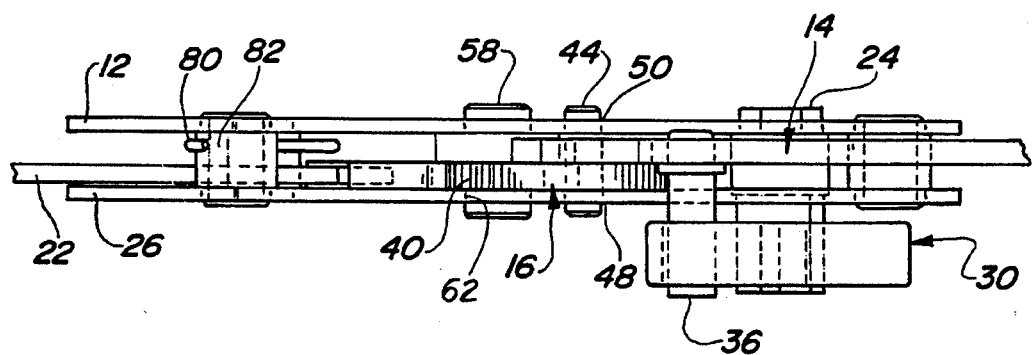
FIG. 2 is a top plan view of the pivot mechanism of FIG. 1.
Figure 3:
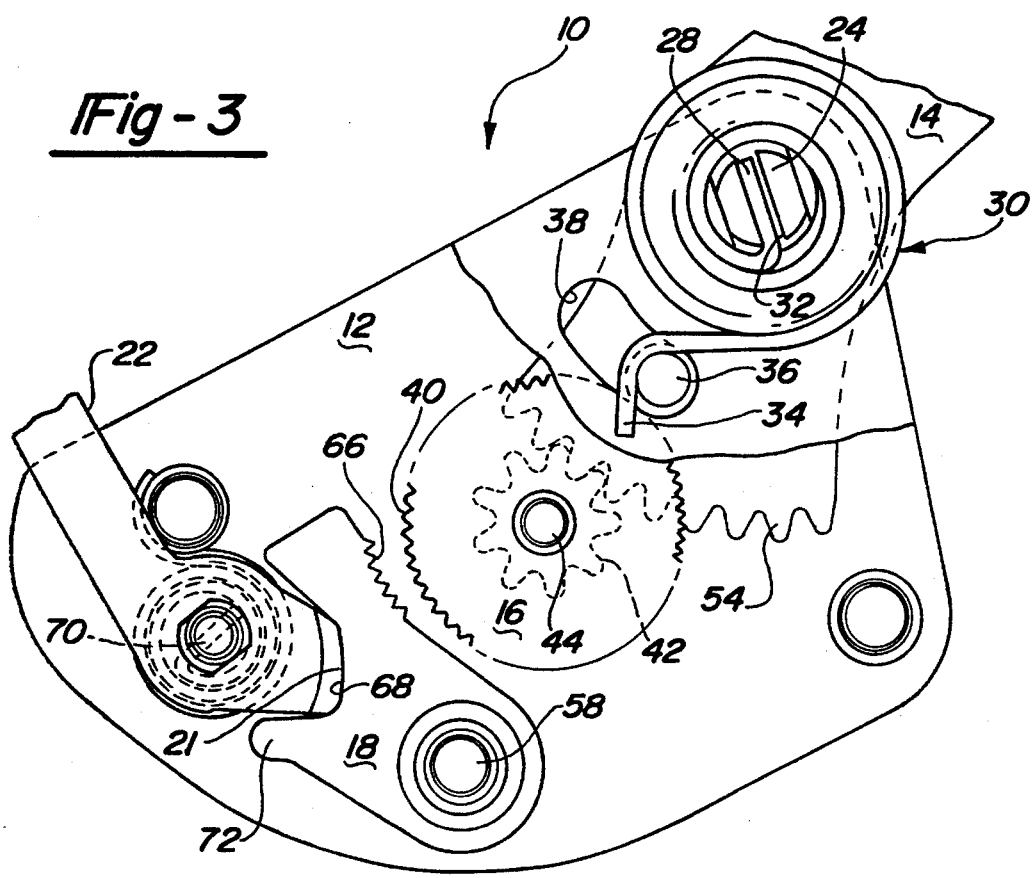
FIG. 3 is a side elevational view of the pivot mechanism of FIG. 1, shown in a released configuration.

The present invention generally provides a locking pivot mechanism which may be used as a seat recliner to reduce play, or chucking, of the seat back when the mechanism is locked. Referring in particular to the drawings, FIGS. 1 through 3 show a locking pivot mechanism indicated generally at 10 which includes a base plate 12 adapted to be affixed to a seat base (not shown), a quadrant 14 adapted to be affixed to a seat back (not shown), a gear 16, a pawl 18, and an engagement member 20 with a handle 22. Quadrant 14 is mounted for rotation about a pivot pin 24 which is rigidly affixed to the base plate 12 and a cover plate 26. An inner end 28 of a flat coil quadrant spring 30 is inserted within a slot 32 formed in the pivot pin 24, and the outer end 34 of quadrant spring 30 is wrapped around a quadrant pin 36 which is rigidly affixed to quadrant 14, such that quadrant 14 is flexibly biased in a counterclockwise direction, and the seat back (not shown) is urged in a forward direction. Quadrant pin 36 slides within an arcuate slot 38 formed in cover plate 26, thus restricting quadrant 14 to a limited angular range of motion.

Gear 16 includes a first and second set of gear teeth 40 and 42, as well as a gear pin 44 with ends which are rotatably mounted within openings 48 and 50 formed in the cover plate 26 and base plate 12, respectively. Gear 16 is rotated about its center of rotation, indicated at point "A". The gear pin 44 and gear openings 48 and 50 define an intentional clearance 52, which enables gear 16 to "float" slightly in the openings. In addition, gear teeth 42 are configured having a smaller pitch circle than gear teeth 40, and gear teeth 42 have a smaller diametral pitch than gear teeth 40. Gear teeth 42 are therefore physically much larger than gear teeth 40. Because gear teeth 42 are arranged to mesh with a plurality of quadrant teeth 54 formed on quadrant 14 with the same diametral pitch as gear teeth 42, the relatively large size of gear teeth 42 and quadrant teeth 54 cause quadrant 14 to smoothly rotate.

A locking pawl 18 has a pawl pin 58 with ends which are mounted for rotation within a cover plate opening 62 and a base plate opening. The pawl 18 is mounted for rotation about the pawl center of rotation, indicated at point "B", between an engaged position shown in FIG. 1, in which a plurality of pawl teeth 66 mesh with gear teeth 40, and a disengaged position shown in FIG. 3, where pawl teeth 66 retract from gear teeth 40 and enable gear 16, and thus quadrant 14, to freely rotate. The pawl center of rotation at point "B" is preferably disposed along a tangent 65 to a pitch arc 45 defined by gear teeth 40 at a pitch point "P", to effectively lock gear 40 from rotating when pawl 18 and gear 16 are meshed with one another. Because gear teeth 40 and pawl teeth 66 are relatively small, pawl 18 is capable of making fine adjustments in the locked position of gear 16. When a horizontal dividing line 55 is drawn through point A, dividing the gear 16 into an upper and lower half, Rotation point B, pitch point P, contact point C and pivot point D are positioned below the horizontal line. Likewise, the gear teeth 44 and pawl teeth 66 engage one another on the lower half of the gear 16.

Pawl 18 further has a thrust cam surface 68 which is adapted to be engaged by a cam surface 21 of the engagement member 20. Engagement member 20 is rigidly affixed to a cam pivot pin 70, having a pivot center at point D, which is pivotally mounted to base plate 12 and cover plate 26 to rotate in a counterclockwise engaging direction or a clockwise disengaging direction. When engagement member 20 rotates in the counterclockwise engaging direction, cam surface 21 pushes on thrust surface 68 of pawl 18 at a contact point "C", to urge pawl teeth 66 to mesh with gear teeth 40 and to thereby inhibit rotation of gear 16. In this position, points A, P and C are substantially collinear on line 75. When engagement member 20 rotates in the disengaging clockwise direction, cam surface 21 relieves thrust or cam surface 68 and allows pawl 18 to rotate in a counterclockwise disengaging direction, such that pawl teeth 66 disengage from gear teeth 40 and allow gear 16 to freely rotate. Pawl 18 further has a stop member 72 which may engage cam surface 21 to prevent excessive rotation of engagement member 20 in the disengaging clockwise direction, as is shown in FIG. 3, after pawl teeth 66 have disengaged from gear teeth 40. An inner end 74 of a coiled wire cam spring 76 is inserted within an opening 78 in cam pivot pin 70. The outer end 80 of cam spring 76 is wrapped around an anchor 82 which is rigidly affixed to base plate 12 and cover plate 26. Cam spring 76 flexibly biases engagement member 20 in the counterclockwise engaging direction, such that cam surface 21 engages thrust surface 68 of pawl 18 and urges pawl teeth 66 to mesh with gear teeth 40 and restrict rotation of gear 16. The pivot mechanism of the present invention may of course utilize any appropriate type of biasing device rather that coiled springs 30 and 76, including leaf springs, helical springs, or hydrodynamic biasing devices.

In operation, the default position of the mechanism is shown in FIG. 1, in which cam spring 76 urges engagement member 20 in an engaging direction, pushing on thrust or cam surface 68 to urge pawl 18 to also rotate in an engaging direction, thus causing pawl teeth 66 to firmly engage gear teeth 40 and prevent rotation of gear 16. Engagement member 20, under the biasing force, automatically accounts for certain dimensional tolerances by urging pawl 18 to mesh firmly with gear 40, regardless of those tolerances, thus reducing any backlash defined between pawl teeth 66 and gear teeth 40. The immobilized gear 16 thus inhibits movement of quadrant 14, and also the seat back (not shown). On the other hand, an operator may pull handle 22 upward, causing cam member 20 to rotate in the disengaging clockwise direction and alleviate the locking force imposed thereby on thrust or cam surface 68. The rotation of engagement member 20 in the disengaging direction is limited by stop member 72, which prevents engagement member 20 from excessively retracting. Pawl 18 is then allowed to fall by the influence of gravity to the disengaged or released position shown in FIG. 3, such that pawl teeth 66 no longer mesh with gear teeth 40. Gear 16 and quadrant 14 with the seat back (not shown) may rotate, and the seat back (not shown) may be reclined or inclined to a desired position. The rotation of quadrant 14 is of course biased in a forward counterclockwise direction by quadrant spring 30, and its angular range of motion is limited by quadrant pin 36 and arcuate slot 38. After the position of the seat back (not shown) and quadrant 14 is adjusted, the operator may release handle 22, to enable cam spring 76 to rotate the engagement member in the engaging direction to again lock the angular position of the gear 16 and quadrant 14 with the seat back (not shown).

According to the novel configuration of the present invention, cam spring 76 is adapted to selectively push on pawl 18 to urge it toward gear 40, thus reducing the distance between the gear center of rotation at point "A" and a pitch arc defined by pawl teeth 66, causing pawl teeth 66 and gear teeth 40 to more firmly mesh. The unique arrangement of the present pivot mechanism provides clearance 52 which enables gear 40 to move slightly toward quadrant 14, preferably to a furthest extent allowed by clearance 52. This movement of gear 16 reduces the distance between the gear center of rotation at point "A" and the quadrant center of rotation, indicated at point "E", thereby causing gear 16 and quadrant 14 to more firmly mesh and reducing chucking of quadrant 14.

The present invention therefore provides a locking pivot mechanism which is relatively small and simple, yet is capable of locking the quadrant in a stationary position to restrict chucking of the quadrant when the mechanism is locked.

It should be understood that the preferred embodiments of the invention have been shown and described herein, and that various modifications of the preferred embodiment of the present invention will become apparent to those skilled in the art after a study of the specification, drawings and the following claims.

What is claimed is:

1. A pivot mechanism for reducing chucking, comprising:
a quadrant adapted to be coupled with a seat back, said quadrant being pivotally mounted and having a set of teeth;

gear means pivotally mounted about a pivot, said gear means having a first and second set of teeth, said first set of teeth rotatably engaged with said quadrant teeth;

pawl means having a set of teeth engaging said gear means second set of teeth at a pitch point for releasably locking said gear means and quadrant in position, said pawl means pivotally mounted about a pivot and moving from a first position engaging said gear means to a second position disengaging said gear means and enabling movement of said gear means and said quadrant, said pawl means including a cam surface; and an engagement means pivotally mounted on a pivot, said engagement means biased in a first position contacting said pawl means cam surface and exerting a locking force on said pawl means when said pawl means is in its first position and in a second position enabling rotation of said pawl means to its second position and when said pawl means is in its first position, said tooth engagement of said pawl means and gear means, when a horizontal divides said gear means into upper and lower halves, occurs only on the lower half of said gear means.

2. The pivot mechanism according to claim 1, wherein said gear means pivot is pivoted in a pivot member and a clearance being formed between said pivot member and said gear means pivot enabling floating movement of said gear means enabling said gear means, when said force is applied, to move in a direction toward said quadrant.

3. The pivot mechanism as claimed in claim 1, wherein said gear means first set of teeth have a smaller diametral pitch than said second set of teeth, such that said pawl means is capable of fine adjustments of the angular position of said gear means, and said quadrant is adapted to rotate more smoothly with reduced backlash effect.

4. The pivot mechanism as claimed in claim 1, wherein said pawl means further includes a stop member adapted to prevent said engagement means from excessively retracting.

5. The pivot mechanism as claimed in claim 1, wherein said gear means, said pawl means and said engagement means are formed with a dimensional tolerance, said engagement means including a biasing spring for providing force and a cam surface for selectively engaging said pawl means cam surface, such that said engagement means biasing spring urges said pawl means and said gear means to firmly mesh regardless of said tolerance.

6. The pivot mechanism as claimed in claim 1, wherein backlash defined between said pawl means and said gear means is reduced when said engagement means urges said pawl means toward said gear means.

7. The pivot mechanism as claimed in claim 1, wherein said pivot mechanism is adapted to couple with a seat base, said pivot mechanism being selectively operative to lock said seat back in an angular orientation with respect to said seat base or alternately to allow said seat back to recline in angular motion with respect to said seat base.

8. A pivot mechanism according to claim 1 wherein said gear means pivot, pitch point and contact point are substantially collinear.

9. A pivot mechanism according to claim 1 wherein said pawl means pivot is substantially located on a tangent of a pitch arc through said pitch point.

* * * * *